United States Patent
Casati et al.

(10) Patent No.: US 12,477,451 B2
(45) Date of Patent: Nov. 18, 2025

(54) METHOD, APPARATUS, AND COMPUTER PROGRAM PRODUCT FOR NETWORK SLICE AWARE PUBLIC LAND MOBILE NETWORK SELECTION

(71) Applicant: Nokia Technologies Oy, Espoo (FI)

(72) Inventors: Alessio Casati, West Molesey (GB); Hannu Hietalahti, Kiviniemi (FI); Betsy Covell, Chicago, IL (US); Sung Hwan Won, Flower Mound, TX (US)

(73) Assignee: Nokia Technologies Oy, Espoo, FL (US)

( * ) Notice: Subject to any disclaimer, the term of this patent is extended or adjusted under 35 U.S.C. 154(b) by 538 days.

(21) Appl. No.: 17/995,133

(22) PCT Filed: Apr. 1, 2020

(86) PCT No.: PCT/US2020/026231
§ 371 (c)(1),
(2) Date: Sep. 30, 2022

(87) PCT Pub. No.: WO2021/201864
PCT Pub. Date: Oct. 7, 2021

(65) Prior Publication Data
US 2023/0143638 A1  May 11, 2023

(51) Int. Cl.
*H04W 48/18* (2009.01)
*H04W 8/06* (2009.01)
*H04W 84/04* (2009.01)

(52) U.S. Cl.
CPC ........... *H04W 48/18* (2013.01); *H04W 8/06* (2013.01); *H04W 84/042* (2013.01)

(58) Field of Classification Search
None
See application file for complete search history.

(56) References Cited

U.S. PATENT DOCUMENTS

2009/0215447 A1    8/2009  Catalano et al.
2016/0066235 A1*   3/2016  Bhat .................. H04W 36/14
                                              455/436
(Continued)

FOREIGN PATENT DOCUMENTS

CN     103370956 B  *  4/2018  ............ H04M 15/60
CN     115244992 A     10/2022
(Continued)

OTHER PUBLICATIONS

S2-2000874 ("[draft] LS on GSMA NG.116 Attribute Area of service and impact on PLMN selection", 3GPP TSG-SA WG2 Meeting #136-AH, Incheon, Korea, Jan. 13-17, 2020, S2-2000874) (Year: 2020).*

(Continued)

*Primary Examiner* — Jinsong Hu
*Assistant Examiner* — Alexander J Yi
(74) *Attorney, Agent, or Firm* — Lippes Mathias LLP

(57) ABSTRACT

A method, apparatus, and computer program product for detecting and switching between locally available PLMNs accessible to a user equipment based on a Preferred PLMN List and a Network Slice Aware PLMN Exceptions List configured by a HPLMN. The user equipment connects to a preferred VPLMN. The user equipment determines that a particular network function is not supported by the connected preferred VPLMN. The user equipment determines that another VPLMN is required to support the particular network function. The user equipment then switches to a non-preferred VPLMN which supports the particular network function. Once the particular network function is no longer necessary for the user equipment to perform a required task, the user equipment switches back a preferred VPLMN.

20 Claims, 9 Drawing Sheets

(56) References Cited

U.S. PATENT DOCUMENTS

| | | | |
|---|---|---|---|
| 2019/0029065 A1* | 1/2019 | Park | H04W 60/00 |
| 2019/0045351 A1 | 2/2019 | Zee et al. | |
| 2019/0159115 A1 | 5/2019 | Russell et al. | |
| 2019/0200285 A1 | 6/2019 | Velev et al. | |
| 2020/0221281 A1* | 7/2020 | Rajadurai | H04W 76/30 |
| 2021/0176622 A1* | 6/2021 | Lauster | H04W 48/14 |

FOREIGN PATENT DOCUMENTS

| | | | | |
|---|---|---|---|---|
| CN | 115299115 A | 11/2022 | | |
| EP | 2683186 A1 * | 1/2014 | | H04W 60/06 |
| EP | 3503600 A1 | 6/2019 | | |
| WO | WO-2018034924 A1 * | 2/2018 | | H04W 36/06 |
| WO | 2019/097499 A1 | 5/2019 | | |
| WO | 2019/217806 A1 | 11/2019 | | |
| WO | 2021/183548 A1 | 9/2021 | | |

OTHER PUBLICATIONS

"3rd Generation Partnership Project; Technical Specification Group Services and System Aspects; Procedures for the 5G System (5GS); Stage 2 (Release 16)", 3GPP TS 23.502, V16.3.0, Dec. 2019, pp. 1-558.
"3rd Generation Partnership Project; Technical Specification Group Services and System Aspects; Security architecture and procedures for 5G system (Release 16)", 3GPP TS 33.501, V16.1.0, Dec. 2019, pp. 1-202.
"3rd Generation Partnership Project; Technical Specification Group Core Network and Terminals; Non-Access-Stratum (NAS) functions related to Mobile Station (MS) in idle mode (Release 16)", 3GPP TS 23.122, V16.4.0, Dec. 2019, pp. 1-80.
"3rd Generation Partnership Project; Technical Specification Group Services and System Aspects; Study on Enhancement of Network Slicing Phase 2 (Release 17)", 3GPP TR 23.700-40, V0.3.0, Jan. 2020, pp. 1-62.
"LS on GSMA NG.116 Attribute Area of service and impact on PLMN selection", 3GPP TSG-SA WG2 Meeting #136-AH, S2-2001726, SA2, Jan. 13-17, 2020, 1 page.
"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.
"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304, V15.5.0, Dec. 2019, pp. 1-55.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.8.0, Dec. 2019, pp. 1-964.
"3rd Generation Partnership Project; Technical Specification Group Core Network and Terminals; Non-Access-Stratum (NAS) protocol for Evolved Packet System (EPS); Stage 3 (Release 16)", 3GPP TS 24.301, V16.3.0, Dec. 2019, pp. 1-570.
"CP-SoR while the UE is at HPLMN", 3GPP TSG-CT WG1 Meeting #119, C1-194645, Samsung, Aug. 26-30, 2019, 7 pages.
"IEEE 802.11", Wikipedia, Retrieved on Oct. 21, 2022, Webpage available at : https://en.wikipedia.org/wiki/IEEE_802.11.
"IEEE 802.16", Wikipedia, Retrieved on Oct. 21, 2022, Webpage available at : https://en.wikipedia.org/wiki/IEEE_802.16.
"IEEE 802.3", Wikipedia, Retrieved on Oct. 21, 2022, Webpage available at : https://en.wikipedia.org/wiki/IEEE_802.3.
International Search Report and Written Opinion received for corresponding Patent Cooperation Treaty Application No. PCT/US2020/026231, dated Jan. 12, 2021, 14 pages.
"LS on GSMA NG. 116 Attribute Area of service and impact on PLMN selection", 3GPP TSG-SA WG2 Meeting #136-AH, S2-2000874, SA2, Jan. 13-17, 2020, 2 pages.
"3rd Generation Partnership Project; Technical Specification Group Services and System Aspects; Service accessibility (Release 17)", 3GPP TS 22.011, V17.1.0, Mar. 2020, pp. 1-34.
Office action received for corresponding European Patent Application No. 20723606.8, dated Jun. 6, 2024, 7 pages.
Office action received for corresponding Chinese Patent Application No. 202080099397.8, dated Nov. 20, 2024, 6 pages of office action and no page of translation available.
"Clarification on PLMN selection for non public network", 3GPP TSG-SA WG1 Meeting #85, S1-190217, LG Electronics, Feb. 18-22, 2019, 8 pages.
Office action received for corresponding Indian Patent Application No. 202247062030, dated Jan. 30, 2023, 8 pages.
Notice of Allowance received for corresponding European Patent Application No. 20723606.8, dated Mar. 14, 2025, 8 pages.
Office action received for corresponding Chinese Patent Application No. 202080099397.8, dated May 9, 2025, 3 pages of office action and no page of translation available.
"3rd Generation Partnership Project; Technical Specification Group Services and System Aspects; Service requirements for the 5G system; Stage 1 (Release 20)", 3GPP TS 22.261 V20.2.0, Mar. 2025, 148 pages.
"3rd Generation Partnership Project; Technical Specification Group Services and System Aspects; Study on enhancement of network slicing; Phase 3 (Release 18)", 3GPP TR 23.700-41, V18.0.0, Dec. 2022, pp. 1-167.
"23.700-41: Solution for KI#2; configuring the UE with per network slice preferred PLMN Lists", SA WG2 Meeting #151e, S2-2204778, Nokia, Agenda Item: 9.14, May 16-20, 2022, pp. 1-5.

* cited by examiner

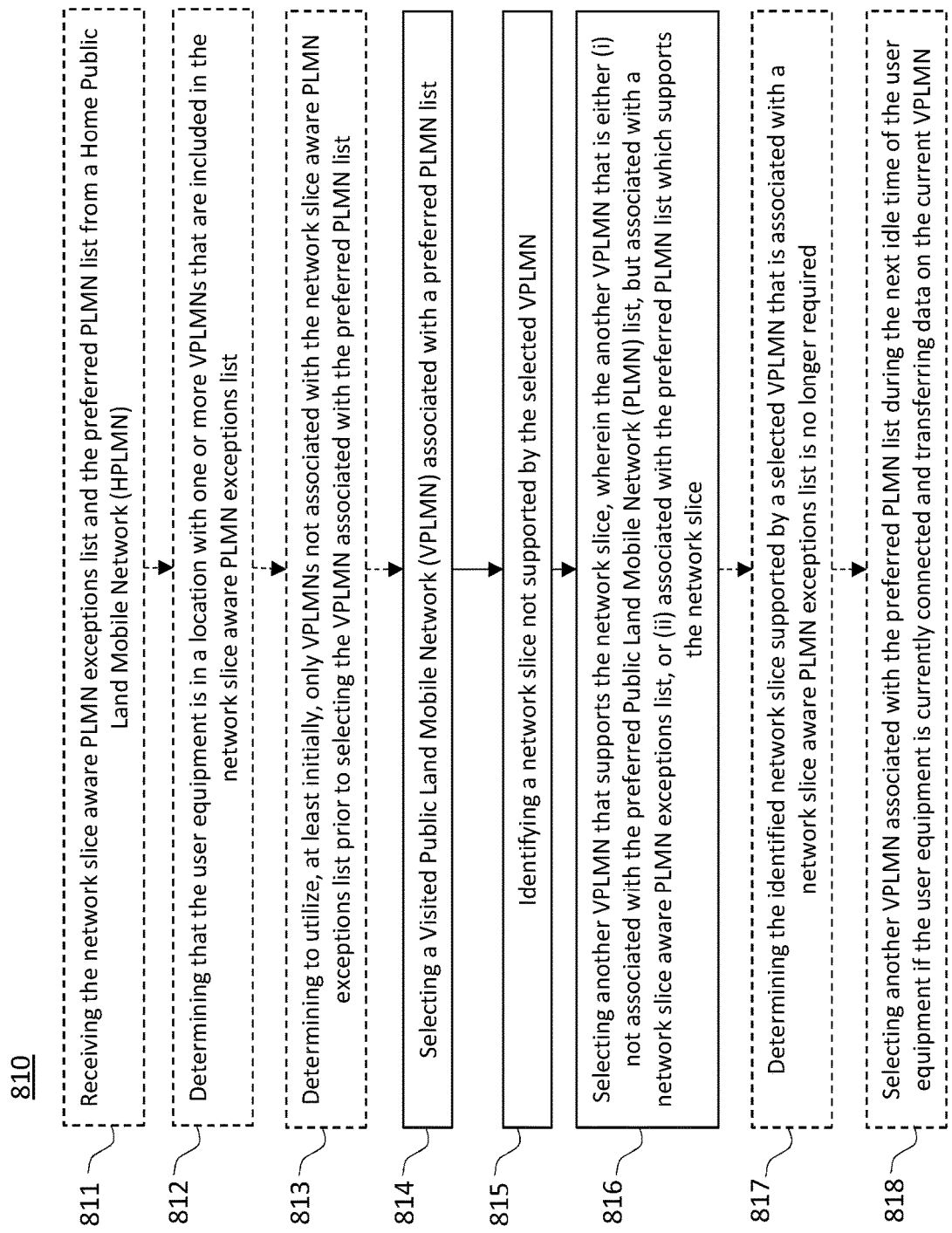

METHOD, APPARATUS, AND COMPUTER PROGRAM PRODUCT FOR NETWORK SLICE AWARE PUBLIC LAND MOBILE NETWORK SELECTION

TECHNOLOGICAL FIELD

An example embodiment relates generally to supporting the identification and selection of available communication networks and network slices supporting particular network functions.

BACKGROUND

A communication system can be seen as a facility that enables communication sessions between two or more entities such as user equipment, base stations/access points, Network Functions (NF), and/or other nodes by providing connectivity between the various entities involved in the communication path. A communication system can be provided, for example, by means of a communication network and one or more compatible communication devices. Telecommunication networks, such as the fifth generation of mobile networks (5G networks) are expected to be the next major phase of mobile telecommunication standards and to bring many improvements in the mobile network user experience. For instance, 5G networks should provide new technical solutions allowing a greater throughput, lower latency, higher reliability, higher connectivity, and higher mobility range. In addition to these improvements in terms of performance, 5G networks are also expected to extend the flexibility in the network usage and to provide users with a wider range of use cases and business models.

The 3rd Generation Partnership Project (3GPP) is a standards organization which develops protocols for mobile telephony and is known for the development and maintenance of various standards including second generation (2G), third generation (3G), fourth generation (4G), Long Term Evolution (LTE), and fifth generation (5G) standards. The 5G network has been designed as a Service Based Architecture (SBA), e.g., a system architecture in which the system functionality is achieved by a set of NFs providing services to other authorized NFs to access their services. The 5G network system allows for the support of network slices, which are end to end logical networks which support a certain set of NFs. In other words, a network slice is a logical network that provides specific network capabilities and network characteristics. Across a 5G network, comprising a plurality of network slices, particular network slices can be configured to support particular features (e.g., hardware specifications, NFs, domain access, etc.) not common to all network slices. User equipment can be configured to access multiple network slices over the same access point.

Identification of a network slice is done via Single Network Slice Selection Assistance Information (S-NSSAI) which is sent to the user equipment via signaling messages between the user equipment and the connected network. The Network Slice Selection Assistance Information (NSSAI) is a collection of S-NSSAIs sent to the user equipment via signaling messages between the user equipment and the connected network. A single user equipment can be served by multiple network slices at a time. The S-NSSAI signaled by the user equipment to the network, assists the network in selecting a particular network slice instance. The network slice instance is a set of NF instances and their required resources (e.g., computing, processing, storage, networking, etc.) which form a deployed network slice. The S-NSSAI is associated with a Public Land Mobile Network (PLMN), for example, the S-NSSAI is configured to indicate an associated PLMN identification code, or other ID information, having network-specific values or standard global values. An S-NSSAI is used by the user equipment for selecting and accessing the PLMN that the S-NSSAI is associated with.

The term "roaming" refers to a wireless telecommunication practice of using a mobile device, or other user equipment, associated with a particular telecommunication provider on another provider's network. Roaming typically occurs while a user is traveling abroad or out of range of their respective provider's network. While user equipment is roaming, subscription to an end to end network slice requires the serving PLMN to support the features that are associated to that network slice. The current 3GPP practice for roaming users is to define a set of preferred PLMNs for a certain country for when the user equipment is roaming. Telecommunication providers may have agreements in place between each other allowing for greater financial, or other, benefits making the use of preferred PLMNs, whenever possible, more appealing for use by roaming user equipment. The preferred PLMNs list can be configure and stored on the user equipment for 5G network communications using the Steering of Roaming (SoR) procedure defined in 3GPP Technical Specification (TS) 23.502 and 33.501. The option of SoR allows the user equipment's home telecommunication provider to provide the listing of preferred PLMNs for selecting foreign hosting PLMNs.

The problem arises that network slices, which are identified by respective S-NSSAIs, and associated preferred PLMNs in a particular country may not support the features required by roaming user equipment. As such the functionality of the user equipment may be hindered and the resulting experience of the user negatively impacted.

BRIEF SUMMARY

A method, apparatus, and computer program product are disclosed which provide a solution to the problem of dynamically selecting a non-preferred PLMN when the user equipment requires the use of a specific network slice identified by a specific S-NSSAI. This is a PLMN with which the Home Public Land Mobile Network (HPLMN) has a roaming agreement to support the specific network slice identified by a respective 5-NSSAI in the HPLMN.

A method, apparatus, and computer program product are disclosed which utilize the SoR mechanism, or similar, to provision the user equipment with a list of preferred PLMNs when certain S-NSSAIs of the HPLMN are required for use by the user equipment. In some embodiments, similar mechanisms to the SoR mechanism include Over The Air Steering of Roaming (OTA), offline Universal Subscriber Identity Module (USIM) provisioning methods, or user equipment provisioning methods. The preferred PLMNs list is configured so as not to be dependent on the locally mapped identification value of the S-NSSAI and the associated network slice within the Visited Public Land Mobile Network (VPLMN) as assigned by the host network's system. In an instance, the VPLMN changes the locally mapped identification value of the S-NSSAI, and the associated network slice, the correct S-NSSAI value to be used in the VPLMN to register for the specific S-NSSAI of the HPLMN is determined based on the original mapping information the VPLMN configured in the user equipment when the VPLMN provided the user equipment with a configured NSSAI.

The user equipment will use the initially configured preferred PLMN list unless specific S-NSSAIs are used that require selection of additional non-preferred PLMNs to accommodate required features of the user equipment. The user equipment is configured with a list of alternate PLMN IDs which support S-NSSAIs that are not supported by the preferred PLMN list. The user equipment only selects one of the alternate PLMNs identified by the PLMN IDs supporting the S-NSSAIs that the preferred PLMNs do not support. In an instance, the user equipment needs to use the S-NSSAIs exception list which is configured to use the alternate PLMN IDs, rather than the preferred PLMNs, the user equipment shall return to the preferred PLMN list when the unsupported features are no longer required by the user equipment. The reselection of the preferred PLMN list happens any time the user equipment comes back to idle mode after it no longer uses the S-NSSAIs for a predefined time period. The user equipment at any time can select the PLMN ID which maximizes the number of S-NSSAIs that the user equipment can use. The user equipment can also select PLMN IDs according to predefined weighted factors assigned to each network slice. If the user equipment cannot determine an optimal PLMN, then the user equipment's Man-Machine-Interface (MMI) will present the user with a decision point where the set of services that are available in each PLMN are explicitly displayed and the user can choose which services, or features, are considered a priority.

In an example embodiment, a method is provided that includes selecting a VPLMN associated with a preferred PLMN list. The method also includes identifying a network slice not supported by the selected VPLMN. The method also includes selecting another VPLMN that supports the network slice, wherein the another VPLMN that is not associated with the preferred PLMN list, but that is associated with a network slice aware PLMN exceptions list, or another VPLMN associated with the preferred PLMN list which supports the network slice.

In an example embodiment, a method is provided that includes determining the identified network slice supported by a selected VPLMN that is associated with a network slice aware PLMN exceptions list is no longer required. In an example embodiment, a method is provided that includes selecting another VPLMN associated with the preferred PLMN list. In an example embodiment, the selecting of another VPLMN occurs during the next idle time of the user equipment if the user equipment is currently connected and transferring data on the current VPLMN. In an example embodiment, the idle time of the user equipment is a predefined length of time in which the user equipment is not sending or receiving any communication signals via a communication interface and/or user interface.

In an example embodiment, a method is provided that includes determining that the user equipment is in a location with one or more VPLMNs that are included in the network slice aware PLMN exceptions list. In an example embodiment, a method is provided that includes determining to utilize, at least initially, only VPLMNs not associated with the network slice aware PLMN exceptions list prior to selecting the VPLMN associated with the preferred PLMN list. In an example embodiment, the selecting of another VPLMN comprises selecting single network slice selection assistance information (S-NSSAI) associated with the network slice aware PLMN exceptions list and identifying the another VPLMN.

In an example embodiment, a method is provided that includes receiving the network slice aware PLMN exceptions list from a Home Public Land Mobile Network (HPLMN). In an example embodiment, the another VPLMN associated with the network slice aware PLMN exceptions list is identified by a roaming agreement with a HPLMN to support the identified network slice. In an example embodiment, the network slice aware PLMN exceptions list defines a precedence order associated with the VPLMNs associated with the network slice aware PLMN exceptions list. In an example embodiment, a method is provided that includes determining a present location and/or Mobile Country Code (MCC) based on available network information and/or Global Position Satellite (GPS) data.

In an example method embodiment, the user equipment learns which network slices a particular VPLMN supports by attempting to register with the particular VPLMN and detecting which network slice the UE request in the registration request is rejected by the particular VPLMN with a cause code indicating that the network slice is not supported in the PLMN. In an example embodiment, the user equipment, upon receiving an indication a network slice is not supported in a VPLMN, selects another VPLMN known to support that network slice. In an example embodiment, the user equipment upon receiving an indication the network slice is not supported by the VPLMN, selects another VPLMN in order to attempt requesting the use of the network slice.

In an example embodiment, an apparatus is provided that comprises at least one processer; and at least one memory including computer program code with the at least one memory and the computer program code configured to, with the at least one processor, cause the apparatus to select a Visited Public Land Mobile Network (VPLMN) associated with a preferred PLMN list. The apparatus is also caused to identify a network slice not supported by the selected VPLMN. The apparatus is also caused to select another VPLMN that supports the network slice, wherein the another VPLMN that is not associated with the preferred Public Land Mobile Network (PLMN) list, but that is associated with a network slice aware PLMN exceptions list, or another VPLMN associated with the preferred PLMN list which supports the network slice.

In an example embodiment, an apparatus is provided that comprises at least one processer; and at least one memory including computer program code with the at least one memory and the computer program code configured to, with the at least one processor, cause the apparatus to determine the identified network slice supported by a selected VPLMN that is associated with a network slice aware PLMN exceptions list is no longer required. The apparatus is also caused to select another VPLMN associated with the preferred PLMN list. In an example embodiment, the selecting another VPLMN occurs during the next idle time of the user equipment if the user equipment is currently connected and transferring data on the current VPLMN. In an example embodiment, the idle time of the user equipment is a predefined length of time in which the user equipment is not sending or receiving any communication signals via a communication interface and/or user interface.

In an example embodiment, an apparatus is provided that comprises at least one processer; and at least one memory including computer program code with the at least one memory and the computer program code configured to, with the at least one processor, cause the apparatus to determine that the user equipment is in a location with one or more VPLMNs that are included in the network slice aware PLMN exceptions list. The apparatus is also caused to determine to utilize, at least initially, only VPLMNs not associated with the network slice aware PLMN exceptions list prior to selecting the VPLMN associated with the preferred PLMN list. In an example embodiment, the selecting of another VPLMN comprises selecting single network slice selection assistance information (S-NSSAI) associated with the network slice aware PLMN exceptions list and identifying the another VPLMN.

In an example embodiment, an apparatus is provided that comprises at least one processer; and at least one memory including computer program code with the at least one memory and the computer program code configured to, with the at least one processor, cause the apparatus to receive the network slice aware PLMN exceptions list from a Home Public Land Mobile Network (HPLMN). In an example embodiment, the another VPLMN associated with the network slice aware PLMN exceptions list is identified by a roaming agreement with a HPLMN to support the identified network slice. In an example embodiment, the network slice aware PLMN exceptions list defines a precedence order associated with the VPLMNs associated with the network slice aware PLMN exceptions list. The apparatus is also caused to determine a present location and/or Mobile Country Code (MCC) based on available network information and/or Global Position Satellite (GPS) data.

In an example apparatus embodiment, the user equipment learns which network slices a particular VPLMN supports by attempting to register with the particular VPLMN and detecting which network slice the UE request in the registration request is rejected by the particular VPLMN with a cause code indicating that the network slice is not supported in the PLMN. In an example embodiment, the user equipment, upon receiving an indication a network slice is not supported in a VPLMN, selects another VPLMN known to support that network slice. In an example embodiment, the user equipment upon receiving an indication the network slice is not supported by the VPLMN, selects another VPLMN in order to attempt requesting the use of the network slice.

In an example embodiment, a computer program product is provided that comprises a non-transitory computer readable storage medium having program code portions stored thereon with the program code portions configured, upon execution, to select a Visited Public Land Mobile Network (VPLMN) associated with a preferred PLMN list. The program code portions are also configured to identify a network slice not supported by the selected VPLMN. The program code portions are also configured to select another VPLMN that supports the network slice, wherein the another VPLMN that is not associated with the preferred Public Land Mobile Network (PLMN) list, but that is associated with a network slice aware PLMN exceptions list, or another VPLMN associated with the preferred PLMN list which supports the network slice.

In an example embodiment, a computer program product is provided that comprises a non-transitory computer readable storage medium having program code portions stored thereon with the program code portions configured, upon execution, to determine the identified network slice supported by a selected VPLMN that is associated with a network slice aware PLMN exceptions list is no longer required. The program code portions are also configured to select another VPLMN associated with the preferred PLMN list. In an example embodiment, the selecting of another VPLMN occurs during the next idle time of the user equipment if the user equipment is currently connected and transferring data on the current VPLMN. In an example embodiment, the idle time of the user equipment is a predefined length of time in which the user equipment is not sending or receiving any communication signals via a communication interface and/or user interface.

In an example embodiment, a computer program product is provided that comprises a non-transitory computer readable storage medium having program code portions stored thereon with the program code portions configured, upon execution, to determine that the user equipment is in a location with one or more VPLMNs that are included in the network slice aware PLMN exceptions list. The program code portions are also configured to determine to utilize, at least initially, only VPLMNs not associated with the network slice aware PLMN exceptions list prior to selecting the VPLMN associated with the preferred PLMN list. In an example embodiment, the selecting of another VPLMN comprises selecting single network slice selection assistance information (S-NSSAI) associated with the network slice aware PLMN exceptions list and identifying the another VPLMN.

In an example embodiment, a computer program product is provided that comprises a non-transitory computer readable storage medium having program code portions stored thereon with the program code portions configured, upon execution, to receive the network slice aware PLMN exceptions list from a Home Public Land Mobile Network (HPLMN). In an example embodiment, the another VPLMN associated with the network slice aware PLMN exceptions list is identified by a roaming agreement with a HPLMN to support the identified network slice. In an example embodiment, the network slice aware PLMN exceptions list defines a precedence order associated with the VPLMNs associated with the network slice aware PLMN exceptions list. The program code portions are also configured to determine a present location and/or Mobile Country Code (MCC) based on available network information and/or Global Position Satellite (GPS) data.

In an example computer program product embodiment, the user equipment learns which network slices a particular VPLMN supports by attempting to register with the particular VPLMN and detecting which network slice the UE request in the registration request is rejected by the particular VPLMN with a cause code indicating that the network slice is not supported in the PLMN. In an example embodiment, the user equipment, upon receiving an indication a network slice is not supported in a VPLMN, selects another VPLMN known to support that network slice. In an example embodiment, the user equipment upon receiving an indication the network slice is not supported by the VPLMN, selects another VPLMN in order to attempt requesting the use of the network slice.

In an example embodiment, an apparatus is provided that includes means for selecting a Visited Public Land Mobile Network (VPLMN) associated with a preferred PLMN list. The apparatus also includes means for means for identifying a network slice not supported by the selected VPLMN. The apparatus also includes means for means for selecting another VPLMN that supports the network slice, wherein the another VPLMN that is not associated with the preferred Public Land Mobile Network (PLMN) list, but that is associated with a network slice aware PLMN exceptions list, or another VPLMN associated with the preferred PLMN list which supports the network slice.

In an example embodiment, an apparatus is provided that includes means for determining the identified network slice supported by a selected VPLMN that is associated with a network slice aware PLMN exceptions list is no longer required. The apparatus also includes means for selecting another VPLMN associated with the preferred PLMN list. In an example embodiment, the selecting of another VPLMN occurs during the next idle time of the user equipment if the user equipment is currently connected and transferring data on the current VPLMN. In an example embodiment, the idle time of the user equipment is a predefined length of time in which the user equipment is not sending or receiving any communication signals via a communication interface and/or user interface.

In an example embodiment, an apparatus is provided that includes means for determining that the user equipment is in a location with one or more VPLMNs that are included in the network slice aware PLMN exceptions list. The apparatus also includes means for determining to utilize, at least initially, only VPLMNs not associated with the network slice aware PLMN exceptions list prior to selecting the VPLMN associated with the preferred PLMN list. In an example embodiment, the selecting of another VPLMN comprises selecting single network slice selection assistance information (S-NSSAI) associated with the network slice aware PLMN exceptions list and identifying the another VPLMN.

In an example embodiment, an apparatus is provided that includes means for receiving the network slice aware PLMN exceptions list from a Home Public Land Mobile Network (HPLMN). In an example embodiment, the another VPLMN associated with the network slice aware PLMN exceptions list is identified by a roaming agreement with a HPLMN to support the identified network slice. In an example embodiment, the network slice aware PLMN exceptions list defines a precedence order associated with the VPLMNs associated with the network slice aware PLMN exceptions list. The apparatus also includes means for determining a present location and/or Mobile Country Code (MCC) based on available network information and/or Global Position Satellite (GPS) data.

In an example apparatus embodiment, the user equipment learns which network slices a particular VPLMN supports by attempting to register with the particular VPLMN and detecting which network slice the UE request in the registration request is rejected by the particular VPLMN with a cause code indicating that the network slice is not supported in the PLMN. In an example embodiment, the user equipment, upon receiving an indication a network slice is not supported in a VPLMN, selects another VPLMN known to support that network slice. In an example embodiment, the user equipment upon receiving an indication the network slice is not supported by the VPLMN, selects another VPLMN in order to attempt requesting the use of said network slice.

Various other aspects are also described in the following detailed description and in the attached claims.

BRIEF DESCRIPTION OF THE DRAWINGS

Figure 1:
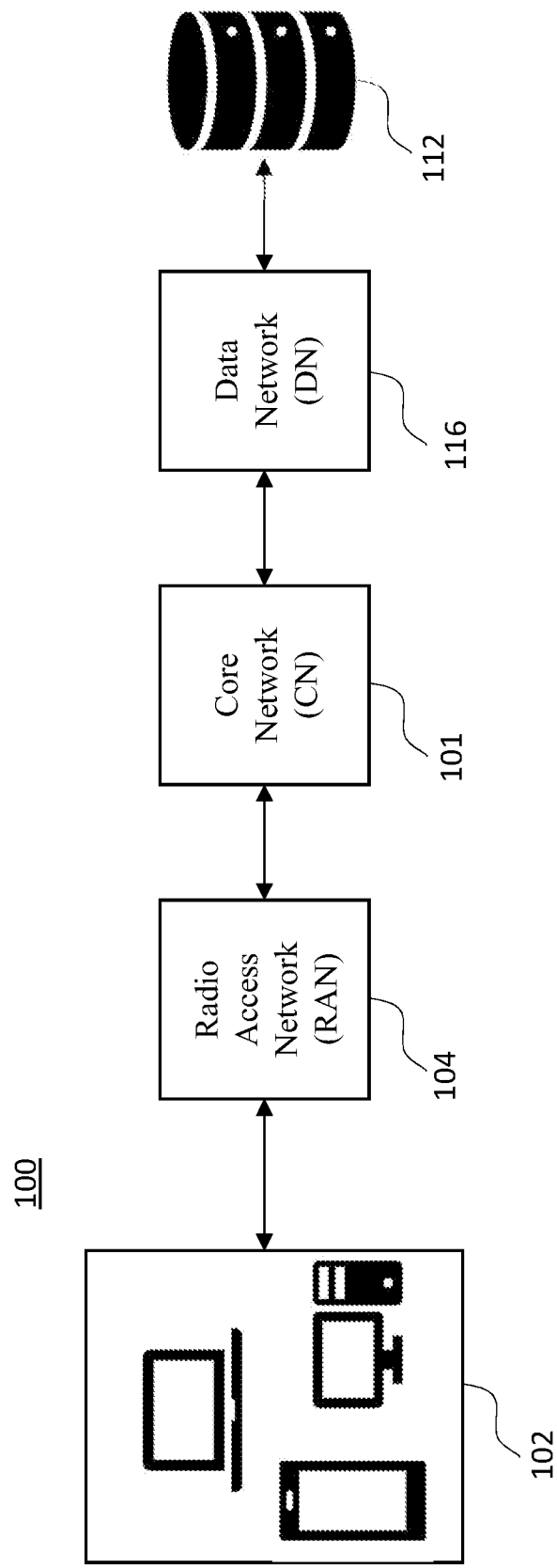
Figure 2:
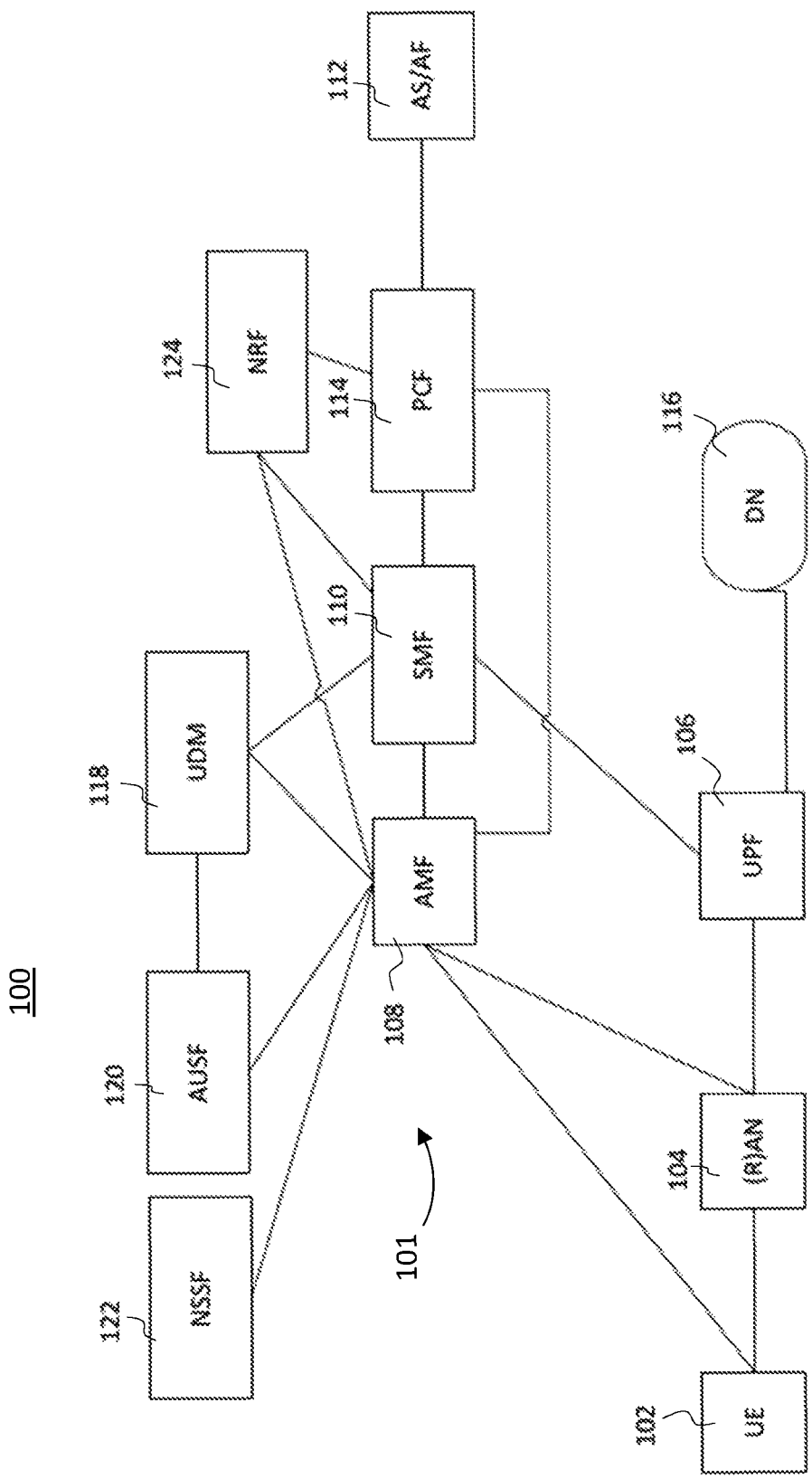
Figure 3:
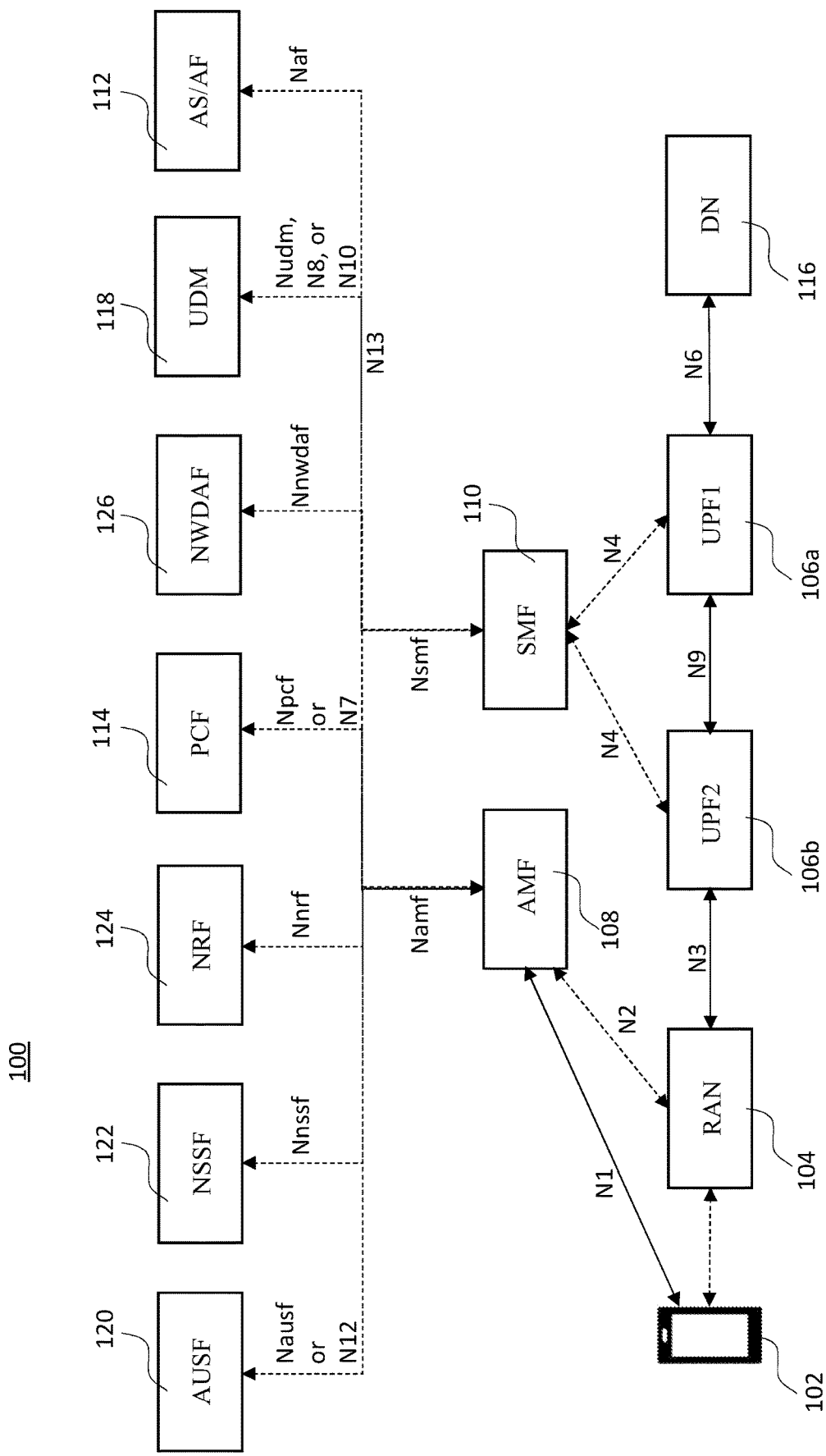
Figure 4:
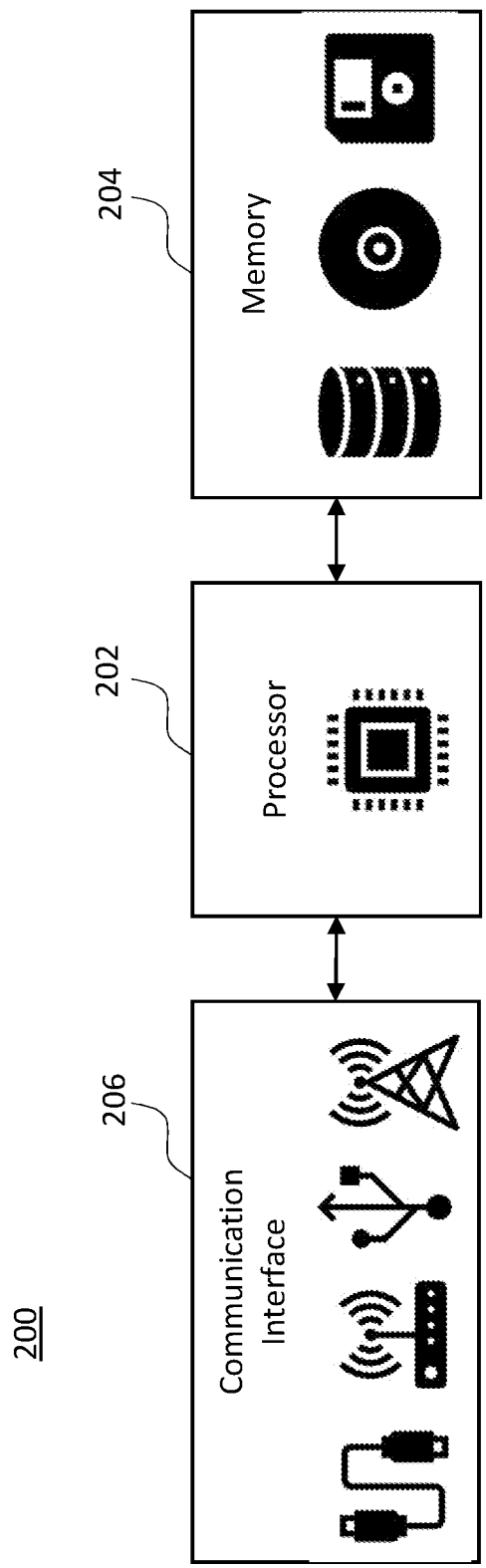
Figure 5:
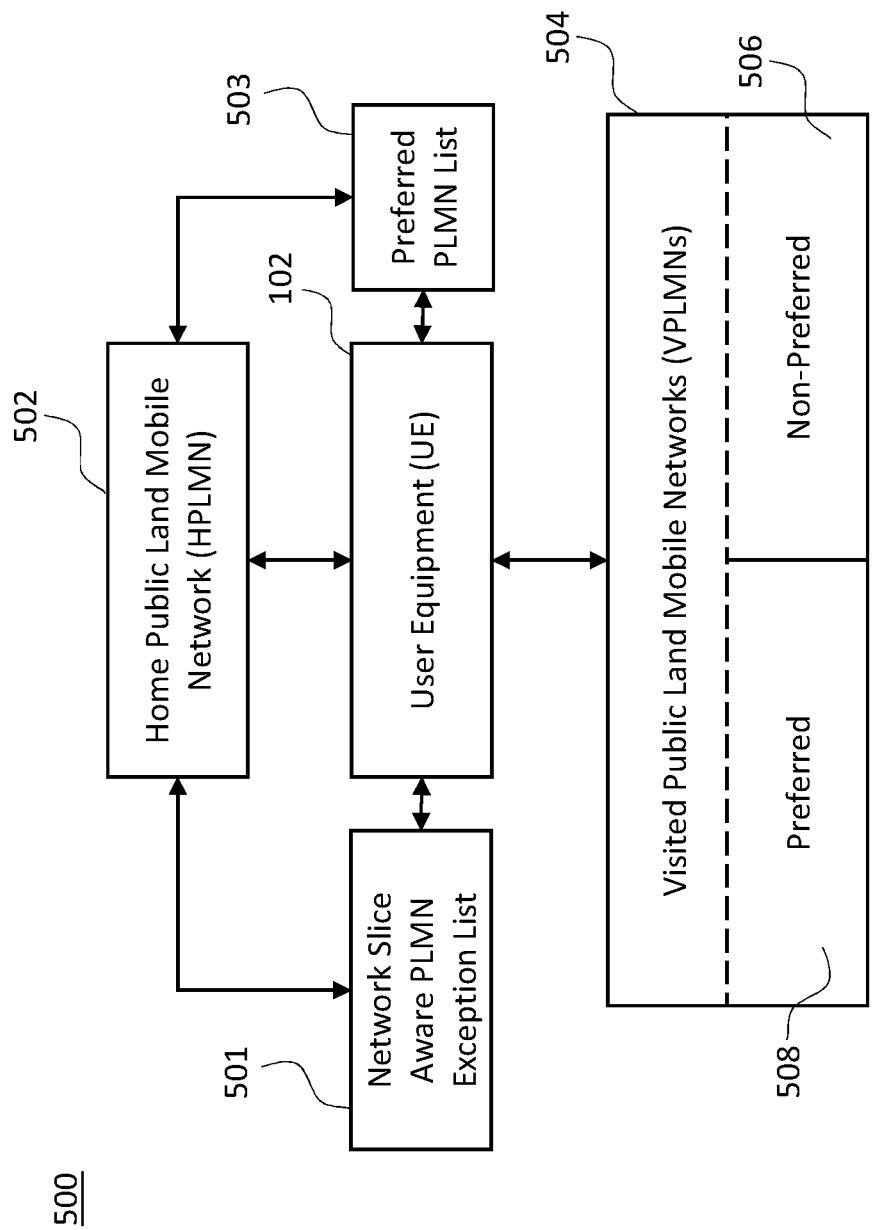
Figure 6:
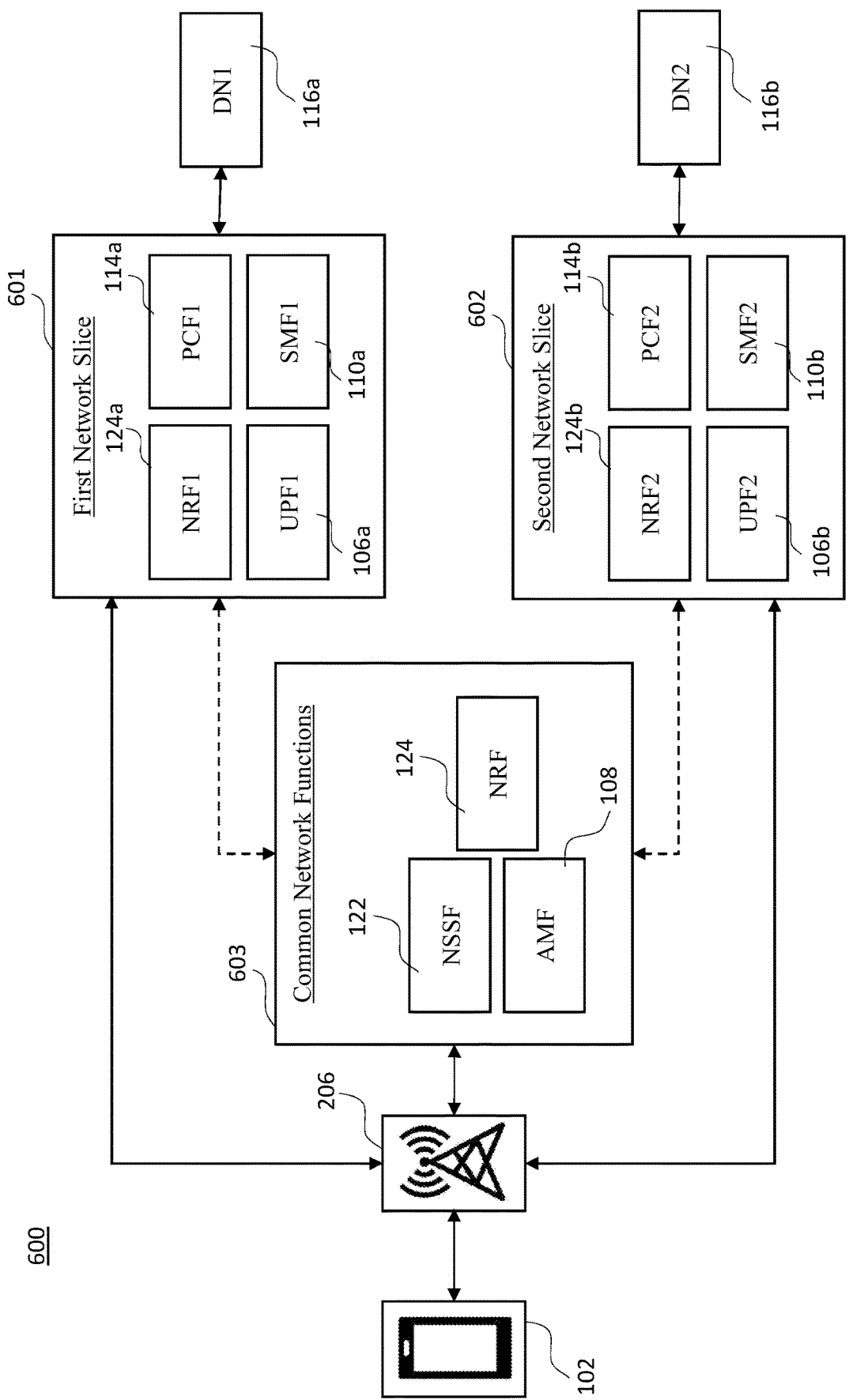
Figure 7A:
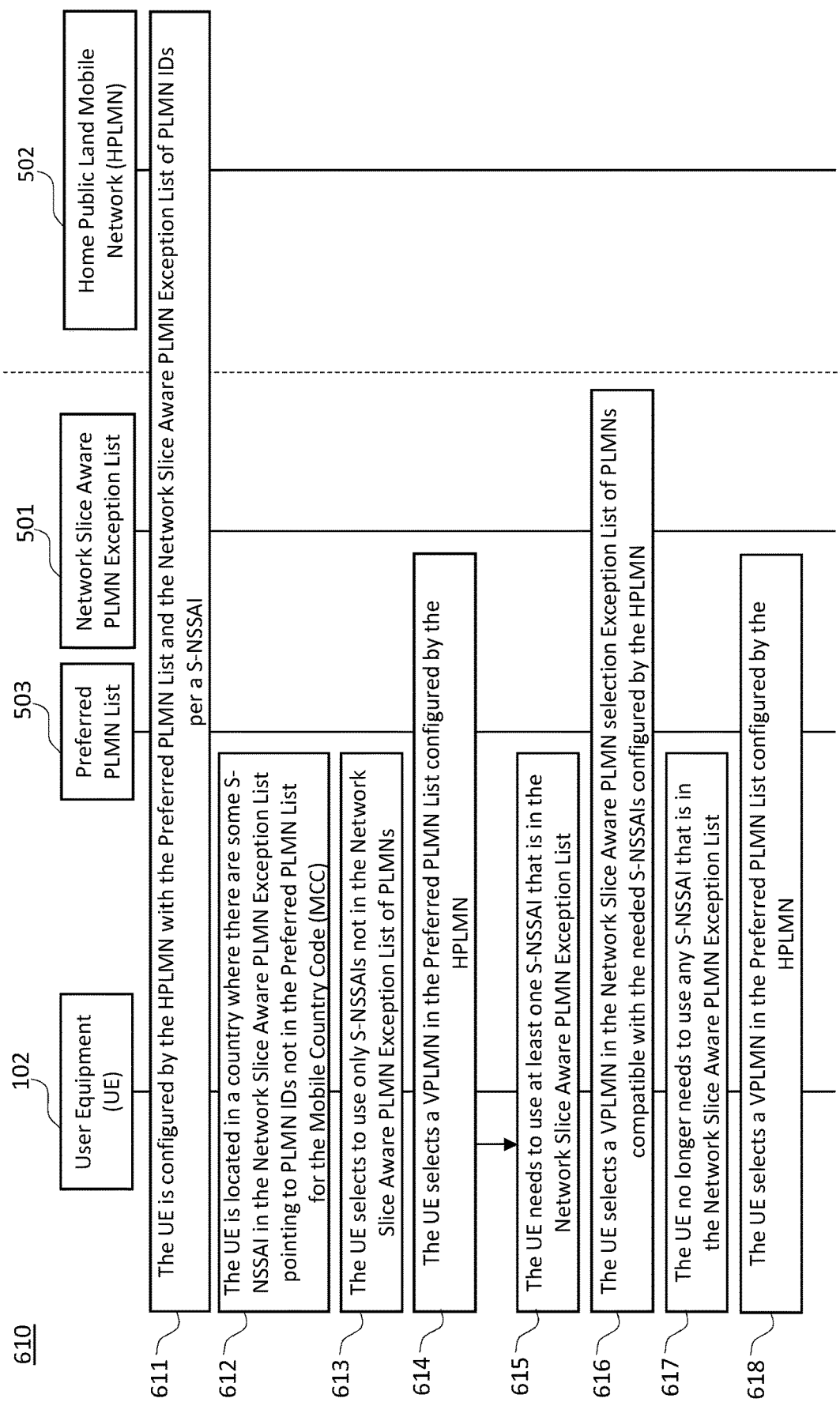
Figure 7B:
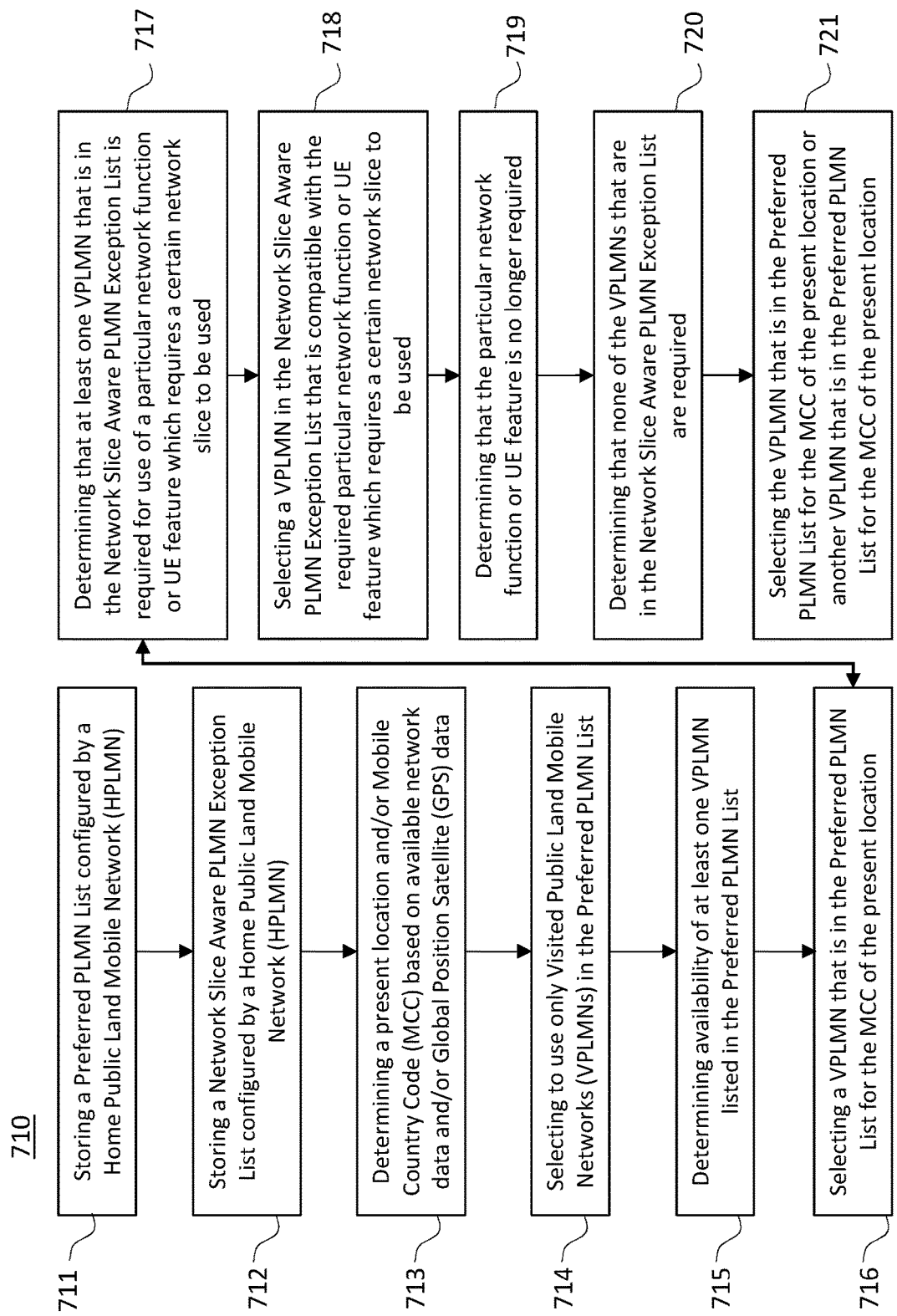

Having thus described embodiments of the disclosure in general terms, reference will now be made to the accompanying drawings, which are not necessarily drawn to scale, and wherein:

FIG. 1 illustrates an example architecture for a communications network, according to some embodiments;

FIG. 2 illustrates an example architecture for a communications network, according to some embodiments;

FIG. 3 illustrates an example architecture for a communications network, according to some embodiments;

FIG. 4 illustrates an example computing device for communicating over communication networks with other network entities, according to some embodiments;

FIG. 5 illustrates an example block diagram of a user communication device interfaced with VPLMNs and a HPLMN, according to some embodiments;

FIG. 6 illustrates an example architecture for a communications network comprising network slices, according to some embodiments;

FIG. 7a is a flow chart illustrating the operations performed by a communication device utilizing a preferred PLMN list and network slice aware PLMN exception list, according to some embodiments;

FIG. 7b is a flow chart illustrating the operations performed, such as by a communication device or other client device, in accordance with an example embodiment; and FIG. 8 is a flow chart illustrating the operations performed, such as by a communication device or other client device, in accordance with an example embodiment;

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "go-between," and similar terms can be used interchangeably to refer to computers connected via, or programs running on, a network or plurality of networks capable of data creation, modification, deletion, transmission, receipt, and/or storage in accordance with embodiments of the present invention. Thus, use of any such terms should not be taken to limit the spirit and scope of embodiments of the present invention.

Additionally, as used herein, the terms "user equipment," "user device," "device," "apparatus," "mobile device," "personal computer," "laptop computer," "laptop," "desktop computer," "desktop," "mobile phone," "tablet," "smartphone," "smart device," "cellphone," "communication device," "user communication device," "terminal," and similar terms can be used interchangeably to refer to computers configured to access a network or plurality of networks for at least the purpose of wired or wireless transmission of communication signals in accordance with embodiments of the present invention. Thus, use of any such terms should not be taken to limit the spirit and scope of embodiments of the present invention.

Additionally, as used herein, the terms "network slice," "slice," "network portion," and similar terms can be used interchangeably to refer to an end to end logical communication network within a PLMN.

Additionally, as used herein, the terms "required feature," "user equipment feature," "UE equipment," "network slice," "desired feature," "slice feature," "network function feature," "network feature," and similar terms can be used interchangeably to refer to a process, or portion of a process, carried out by the user equipment over a network which necessitates communication between the user equipment and a particular network slice.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

In the following, certain embodiments are explained with reference to communication devices capable of communication via a wired and/or wireless network and communication systems serving such communication devices. Before explaining in detail the exemplifying embodiments, certain general principles of a wired and/or wireless communication system, access systems thereof, and communication devices are briefly explained with reference to FIGS. 1-3 to assist in understanding the technology underlying the described examples.

According to some embodiments, a communication device or terminal can be provided for wireless access via cells, base stations, access points or the like (e.g., wireless transmitter and/or receiver nodes providing access points for a radio access communication system and/or other forms of wired and/or wireless networks). Such wired and/or wireless networks include, but are not limited to, networks configured to conform to 2G, 3G, 4G, LTE, 5G, and any other similar or yet to be developed future communication network standards. The present disclosure contemplates that any methods, apparatuses, computer program codes, and any portions or combination thereof can also be implemented with yet undeveloped communication networks and associated standards as would be developed in the future and understood by one skilled in the art in light of the present disclosure.

Access points and hence communications there through are typically controlled by at least one appropriate control apparatus so as to enable operation thereof and management of mobile communication devices in communication therewith. In some embodiments, a control apparatus for a node can be integrated with, coupled to, and/or otherwise provided for controlling the access points. In some embodiments, the control apparatus can be arranged to allow communications between a user equipment and a core network or a network entity of the core network. For this purpose, the control apparatus can comprise at least one memory, at least one data processing unit such as a processor or the like, and an input/output interface. Via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions can be distributed between several control units. In some embodiments, each base station can comprise a control apparatus. In alternative embodiments, two or more base stations can share a control apparatus.

Access points and associated controllers can communicate with each other via a fixed line connection and/or via a radio interface. The logical connection between the base station nodes can be provided for example by an X2, an S1, and/or the like interface. This interface can be used for example for coordination of operation of the stations and performing reselection or handover operations. The logical communication connection between the initial communication node and the final communication node on the network can comprise a plurality of intermediary nodes. Additionally, any of the nodes can be added to and removed from the logical communication connection as required to establish and maintain a network function communication.

The communication device or user equipment can comprise any suitable device capable of at least receiving a communication signal comprising data. The communication signal can be transmitted via a wired connection, a wireless connection, or some combination thereof. For example, the device can be a handheld data processing device equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, earpieces with wireless connectivity, jewelry and so on, universal serial bus (USB) sticks with wireless capabilities, modem data cards, machine type devices or any combinations of these or the like.

In some embodiments, a communication device, e.g., configured for communication with the wireless network or a core network entity, can be exemplified by a handheld or otherwise mobile communication device (or user equipment UE). A mobile communication device can be provided with wireless communication capabilities and appropriate electronic control apparatus for enabling operation thereof. Thus, the communication device can be provided with at least one data processing entity, for example a central processing unit and/or a core processor, at least one memory and other possible components such as additional processors and memories for use in software and hardware aided execution of tasks it is designed to perform. The data processing, storage and other relevant control apparatus can be provided on an appropriate circuit board and/or in chipsets. Data processing and memory functions provided by the control apparatus of the communication device are configured to cause control and signaling operations in accordance with certain embodiments as described later in this description. A user can control the operation of the communication device by means of a suitable user interface such as touch sensitive display screen or pad and/or a keypad, one of more actuator buttons, voice commands, combinations of these, or the like. A speaker and a microphone are also typically provided. Furthermore, a mobile communication device can comprise appropriate connectors (either wired or wireless) to other devices and/or for connecting external accessories, for example hands-free equipment, thereto.

In some embodiments, a communication device can communicate wirelessly via appropriate apparatus for receiving and transmitting signals. In some embodiments, a radio unit can be connected to the control apparatus of the device. The radio unit can comprise a radio part and associated antenna arrangement. The antenna arrangement can be arranged internally or externally to the communication device.

FIGS. 1-3 illustrate various example architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide an air interface (e.g., New Radio (NR)) for communication or connection between a user equipment 102 (UE 102) and a data network 116 (DN 116) via a core network 101 (CN 101) of the communications network 100. The UE 102 can be associated with one or more devices associated with one or more NF service consumers. As illustrated in FIG. 1, a communications network 100 can be provided in which the UE 102 is in operable communication with the RAN 104, such as by way of a transmission tower, a base station, an access point, a network node, and/or the like. In some embodiments, the RAN 104 can communicate with the CN 101 or a component or entity thereof. In some embodiments, the CN 101 can facilitate communication between the UE 102 and the DN 116, such as for sending data, messages, requests, and/or the like. In some embodiments, the DN 116 or the CN 101 can be in communication with an application server or application function 112 (AS/AF 112). The RAN 104, CN 101, DN 116, and/or AS/AF 112 can be associated with an NRF, NF service producer, SCP, SEPP, PCF, the like, or any combination thereof.

In the context of a 5G network, such as illustrated in FIGS. 2 and 3, the communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the RAN 104, which can then relay the communications between the UE 102 and the CN 101, the CN 101 being connected to the DN 116, which can be in communication with one or more AS/AF 112. In some embodiments, the UE 102 can be in communication with a radio access network 104 (RAN 104), which can act as a relay between the UE 102 and other components or services of the CN 101. For instance, in some embodiments, the UE 102 can communicate with the RAN 104, which can in turn communicate with an Access and Mobility Management Function 108 (AMF 108). In other instance or embodiments, the UE 102 can communicate directly with the AMF 108. In some embodiments, the AMF 108 can be in communication with one or more network functions (NFs), such as an Authentication Server Function 120 (AUSF 120), a Network Slice Selection Function 122 (NSSF 122), a Network Repository Function 124 (NRF 124), a Policy Charging Function 114 (PCF 114), a Network Data Analytics Function 126 (NWDAF 126), a Unified Data Management function 118 (UDM 118), the AS/AF 112, a Session Management Function 110 (SMF 110), and/or the like.

In some embodiments, the SMF 110 can be in communication with one or more User Plane Functions 106 (UPF 106, UPF 106a, UPF 106b, collectively "UPF 106"). By way of example only, in some embodiments, the UPF 106 can be in communication with the RAN 104 and the DN 116. In other embodiments, the DN 116 can be in communication with a first UPF 106a and the RAN 104 can be in communication with a second UPF 106b, while the SMF 110 is in communication with both the first and second UPFs 106a, b and the first and second UPFs 106a, b are in communication each with the other.

In some embodiments, the UE 102 can comprise a single-mode or a dual-mode device such that the UE 102 can be connected to one or more RANs 104. In some embodiments, the RAN 104 can be configured to implement one or more Radio Access Technologies (RATs), such as Bluetooth, Wi-Fi, and GSM, UMTS, LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6

GHz), FR2 (mm Wave), other suitable frequency bands, sub-bands thereof, and/or the like. In some embodiments, the communications network 100 can comprise or employ massive multiple input and multiple output (massive MIMO) antennas. In some embodiments, the communications network 100 can comprise multi-user MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, devices, or techniques, such as small cell, low-powered RAN, beamforming of radio waves, WIFI-cellular convergence, non-orthogonal multiple access (NOMA), channel coding, and the like.

As illustrated in FIG. 3, the UE 102 can be configured to communicate with the RAN 104 in a N1 interface, e.g., according to a non-access stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in a Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which can act as a bridge between the control plane and the user plane, such as acting as a conduit for a Protocol Data Unit (PDU) session during which information is transmitted between, e.g., the UE 102 and the CN 101 or components/services thereof.

It will be appreciated that certain example embodiments described herein arise in the context of a telecommunications network, including but not limited to a telecommunications network that conforms to and/or otherwise incorporates aspects of a fifth-generation (5G) architecture. While FIGS. 1-3 illustrate various configurations and/or components of an example architecture of the communications network 100, many other systems, system configurations, networks, network entities, and pathways/protocols for communication therein are contemplated and considered within the scope of this present disclosure.

While the methods, devices/apparatuses, and computer program products/codes described herein are described within the context of a fifth-generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the present disclosure.

Turning now to FIG. 4, examples of an apparatus that may be embodied by the user equipment or by a network entity, such as server or other computing device are depicted in accordance with an example embodiment of the present disclosure. As described below in conjunction with the flowcharts and block diagrams of FIGS. 5, 6, 7a, 7b, and 8, the apparatus 200 of an example embodiment can be configured to perform the functions described herein. In any instance, the apparatus 200 can more generally be embodied by a computing device, such as a server, a personal computer, a computer workstation or other type of computing device including those functioning as a user equipment and/or a component of a wireless network or a wireless local area network. Regardless of the manner in which the apparatus 200 is embodied, the apparatus of an example embodiment can be configured as shown in FIG. 4 so as to include, be associated with or otherwise be in communication with a processor 202 and a memory device 204 and, in some embodiments, and/or a communication interface 206. Although not illustrated, the apparatus of an example embodiment may also optionally include a user interface, such as a touch screen, a display, a keypad or the like.

The processor 202 (and/or co-processors or any other circuitry assisting or otherwise associated with the processor) can be in communication with the memory device 204 via a bus for passing information among components of the apparatus 200. The memory device can include, for example, one or more volatile and/or non-volatile memories, such as a non-transitory memory device. In other words, for example, the memory device can be an electronic storage device (e.g., a computer readable storage medium) comprising gates configured to store data (e.g., bits) that can be retrievable by a machine (e.g., a computing device like the processor). The memory device can be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor.

The apparatus 200 can, in some embodiments, be embodied in various computing devices as described above. However, in some embodiments, the apparatus can be embodied as a chip or chip set. In other words, the apparatus can comprise one or more physical packages (e.g., chips) including materials, components and/or wires on a structural assembly (e.g., a baseboard). The structural assembly can provide physical strength, conservation of size, and/or limitation of electrical interaction for component circuitry included thereon. The apparatus can therefore, in some cases, be configured to implement an embodiment of the present invention on a single chip or as a single "system on a chip." As such, in some cases, a chip or chipset can constitute means for performing one or more operations for providing the functionalities described herein.

The processor 202 can be embodied in a number of different ways. For example, the processor can be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor can include one or more processing cores configured to perform independently. A multi-core processor can enable multiprocessing within a single physical package. Additionally or alternatively, the processor can include one or more processors configured in tandem via the bus to enable independent execution of instructions, pipelining and/or multithreading.

In an example embodiment, the processor 202 can be configured to execute instructions stored in the memory device 204 or otherwise accessible to the processor. Alternatively or additionally, the processor can be configured to execute hard coded functionality. As such, whether configured by hardware or software methods, or by a combination thereof, the processor can represent an entity (e.g., physically embodied in circuitry) capable of performing operations according to an embodiment of the present disclosure while configured accordingly. Thus, for example, when the processor is embodied as an ASIC, FPGA or the like, the processor can be specifically configured hardware for conducting the operations described herein. Alternatively, as another example, when the processor is embodied as an executor of instructions, the instructions can specifically configure the processor to perform the algorithms and/or operations described herein when the instructions are executed. However, in some cases, the processor can be a processor of a specific device (e.g., an encoder and/or a decoder) configured to employ an embodiment of the present invention by further configuration of the processor by instructions for performing the algorithms and/or operations described herein. The processor can include, among other things, a clock, an arithmetic logic unit (ALU) and logic gates configured to support operation of the processor.

In embodiments that include a communication interface 206, the communication interface can be any means such as a device or circuitry embodied in either hardware or a combination of hardware and software that is configured to receive and/or transmit data from/to a network and/or any other device or module in communication with the apparatus 200, such as NF, NRF, a base station, an access point, SCP, UE 102, radio access network, core network services, an application server/function, a database or other storage device, etc. In this regard, the communication interface can include, for example, an antenna (or multiple antennas) and supporting hardware and/or software for enabling communications with a wireless communication network.

Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication. As such, for example, the communication interface can include a communication modem and/or other hardware/ software for supporting communication via cable, digital subscriber line (DSL), universal serial bus (USB) or other mechanisms. In some embodiments, a session management function can comprise a 5GC session management function for any suitable control and user plane separation (CUPS) architecture, such as for the gateway GPRS support node (GGSN-C), TWAG-C, BNG-CUPS, N4, Sxa, Sxb, Sxc, evolved packet core (EPC) SWG-C, EPC PGW-C, EPC TDF-C, and/or the like.

As illustrated, the apparatus 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the apparatus 200, at least in part. In some embodiments, the processor 202 can be configured to control the functioning of the transmitter and receiver by effecting control signaling via electrical leads to the transmitter and receiver. Likewise, the processor 202 can be configured to control other elements of apparatus 200 by effecting control signaling via electrical leads connecting the processor 202 to the other elements, such as a display or the memory 204.

The apparatus 200 can be capable of operating with one or more air interface standards, communication protocols, modulation types, access types, and/or the like. Signals sent and received by the processor 202 can include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals can include speech data, user generated data, user requested data, and/or the like.

For example, the apparatus 200 and/or a cellular modem therein can be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 200 can be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 200 can be capable of operating in accordance with 2.5G wireless communication protocols General Packet Radio Service (GPRS), Enhanced Data GSM Environment (EDGE), and/or the like. Further, for example, the apparatus 200 can be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The NA 200 can be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 200 can be capable of operating in accordance with 4G wireless communication protocols, such as LTE Advanced, 5G, and/or the like as well as similar wireless communication protocols that can be subsequently developed. In some embodiments, the apparatus 200 can be capable of operating according to or within the framework of any suitable CUPS architecture, such as for the gateway GPRS support node (GGSN-C), trusted wireless access gateway (TWAG-C), broadband network gateways (BNGs), N4, Sxa, Sxb, Sxc, evolved packet core (EPC) SWG-C, EPC PGW-C, EPC TDF-C, and/or the like. Indeed, although described herein in conjunction with operation with a 5G system, the apparatus and method may be configured to operate in conjunction with a number of other types of systems including systems hereinafter developed and implemented.

Some of the embodiments disclosed herein can be implemented in software, hardware, application logic, or a combination of software, hardware, and application logic. The software, application logic, and/or hardware can reside on memory 204, the processor 202, or electronic components, for example. In some example embodiments, the application logic, software or an instruction set is maintained on any one of various conventional computer-readable media. In the context of this document, a "computer-readable medium" can be any non-transitory media that can contain, store, communicate, propagate or transport the instructions for use by or in connection with an instruction execution system, apparatus, or device, such as a computer or data processor circuitry, with examples depicted at FIG. 4, computer-readable medium can comprise a non-transitory computer-readable storage medium that can be any media that can contain or store the instructions for use by or in connection with an instruction execution system, apparatus, or device, such as a computer.

FIG. 5 illustrates a communication interface between UE 102 and associated PLMNs. As illustrated UE 102 is configured by a HPLMN 502 with a network slice aware PLMN exception list 501 and a preferred PLMN list 503. In some embodiments, the network slice aware PLMN exception list 501 and the preferred PLMN list 503 may be provided by SoR or by similar mechanisms to the SoR including OTA, offline USIM provisioning methods, or UE provisioning methods. The network slice aware PLMN exception list 501 and the preferred PLMN list 503 may each include one or more VPLMNs. Additionally, for each VPLMN in the network slice aware PLMN exception list 501, the network slice aware PLMN exception list may also identify locations, such as countries, in which the preferred PLMN list 503 is ineffective for the respective VPLMN. The UE 102 utilizes the network slice aware PLMN exception list 501 and the preferred PLMN list 503 to establish connections with a plurality of VPLMNs 504 at different points in time. In this regard, the UE 102 selects and establishes connections with at least one VPLMN of the plurality of Preferred VPLMNs 508 and Non-Preferred VPLMNs 506 based on the preferred PLMN list 503 and/or the network slice aware PLMN exception list 501 respectively. Additionally, by way of example, the UE 102 can select and establish a first connection with one of the Preferred VPLMNs 508 as identified by the preferred PLMN list 503. In accordance with an example embodiment, the UE 102 then determines a need or desire to utilize a NF not supported by the selected preferred VPLMN. Next, the UE 102 of this example embodiment disconnects from the first preferred VPLMN and further selects and establishes a second connection with one of the Non-Preferred VPLMNs 506 as identified by the network slice aware PLMN exception list 501, which does support the NF that is needed or desired. Subsequently, the UE 102 then determines the NF not supported by the preferred VPLMN is no longer required and disconnects from the non-preferred VPLMN and reestablishes the connection to the preferred VPLMN or to another VPLMN on the Preferred PLMN list.

It will be appreciated that the UE 102 of an example embodiment prioritizes the Preferred VPLMNs 508 over the Non-Preferred VPLMNs 506 when establishing and maintaining network connections unless a particular need or desire arises which can only be facilitated by a particular non-preferred VPLMN. It will also be appreciated that under certain circumstances (e.g., travel through a remote region) the UE 102 may only have access to either the Preferred VPLMNs 508 or the Non-Preferred VPLMNs 506. Further, among the Preferred VPLMNs 508 identified by the preferred PLMN list 503 the HPLMN can configure the preferred PLMN list 503 to prioritize the preferred VPLMNs. Thus, upon selecting a Preferred VPLMN from the preferred PLMN list, the UE may select a Preferred VPLMN based upon the priority of the Preferred VPLMNs. Additionally, among the Non-Preferred VPLMNs 506 identified by the network slice aware PLMN exception list 501 the HPLMN can configure the preferred PLMN list 503 to prioritize the non-preferred VPLMNs. Thus, upon selecting a Non-Preferred VPLMN from the network slice aware PLMN exception list, the UE may select a Non-Preferred VPLMN based upon the priority of the Non-Preferred VPLMNs. Prioritization of VPLMNs can be done by applying weighted values to characteristics of each VPLMN including a cost, signal strength, NF support/compatibility, quality of service, the like, or any combination thereof. The UE 102 can be further configured to prioritize characteristics based on predefined preferences established, for example, by the HPLMN or the user of the UE 102. In an instance where characteristics are not prioritized, a user of the UE 102 can be presented with available VPLMN options and at least some of their associated characteristics, such that the user of the UE 102 can manually select or prioritize the available VPLMNs on a regional basis.

FIG. 6 illustrates an example communication network comprising two network slices. The UE 102 utilizes Communication Interface 206 to establish a plurality of network communications. Communication Interface 206 can connect the UE 102 to the Common Network Functions 603, the First Network Slice 601, or the Second Network Slice 602. It will be appreciated that Communication Interface 206 can connect the UE 102 directly to either network slice thus bypassing the Common Network Functions 603. Additionally, it will be appreciated that Communication Interface 206 can connect the UE 102 indirectly to either network slice by establishing a connection through the Common Network Functions 603. The First Network Slice 601 comprises a plurality of NFs including at least NRF1 124*a*, PCF1 114*a*, UPF1 106*a*, and SMF1 110*a*, wherein each of the NFs of the First Network Slice 601 are independent of the Common Network Functions 603 and the NFs of the Second Network Slice 602. Further, the First Network Slice 601 is configured to connect the UE 102 to DN1 116*a*. The Second Network Slice 602 comprises a plurality of NFs including at least NRF2 124*b*, PCF2 114*b*, UPF2 106*b*, and SMF2 110*b*, wherein each of the NFs of the Second Network Slice 602 are independent of the Common Network Functions 603 and the NFs of the First Network Slice 601. Further, the Second Network Slice 602 is configured to connect the UE 102 to DN2 116*b*.

FIG. 7*a* illustrates a flow diagram of the operations of an example method 610 performed by the apparatus 200 embodied by UE 102 in conjunction with the Preferred PLMN List 503, the Network Slice Aware PLMN Exception List 501, and the UE's HPLMN 502. In some embodiments, the apparatus 200 embodied by the UE 102 carries out the process elements of method 610 by execution of a related computer program product comprising computer program code. As shown in block 611, the UE 102 is configured by the HPLMN 502 with the Preferred PLMN List 503 and the Network Slice Aware PLMN Exception List 501 each comprising one or more respective PLMN IDs as identified by a respective S-NSSAI. The apparatus 200 embodied by the UE 102 may be configured to store the Preferred PLMN List 503 and the Network Slice Aware PLMN Exception List 501 in memory 204 or otherwise in a database or other memory device accessible to the processor 2020. As shown in block 612, the UE 102 is located in a country, such as may be identified by a Mobile Country Code (MCC), and identifies one or more S-NSSAIs in the Network Slice Aware PLMN Exception List 501 pointing to PLMN IDs not in the Preferred PLMN List 503. It will be appreciated that the applicable MCC of a country can be identified by the UE 102 by way of a global positioning mechanism (e.g., Global Positioning System (GPS), Global Navigation Satellite System (GNSS), or the like), identification information transmitted to UE 102 by the VPLMNs, NSSAI, and/or S-NSSAI, user inputs through a user interface of UE 102, the like, or any combination thereof.

As shown in block 613, the apparatus 200 of the UE 102 is configured to select to use only S-NSSAIs and associated VPLMNs not in the Network Slice Aware PLMN Exception List 501. In other words, the apparatus 200 of the UE 102 is configured to select to use only S-NSSAIs and associated VPLMNs on the Preferred PLMN List 503. As shown in block 614, the apparatus embodied by the UE 102 is configured to select a VPLMN in the Preferred PLMN List 503, as configured by the HPLMN 502. As shown in block 615, the UE 102 needs or desires to use a function that is not supported by the VPLMN that has been selected from the Preferred PLMN list or by any of the other VPLMNs of the Preferred PLMN list, but that is supported by at least one VPLMN that is in the Network Slice Aware PLMN Exception List 501, as configured by the HPLMN 502. As shown in block 616, the apparatus 200 embodied by the UE 102 is configured to select a VPLMN in the Network Slice Aware PLMN Exception List 501 of VPLMNs that is capable of performed the function that is required or desired.

Subsequently, as shown in block 617, the UE 102 no longer needs or desires to use the function that is not supported by the VPLMNs of the Preferred PLMN List 503 and that triggered the switch to a VPLMN from the Network Slice Aware PLMN Exception List 501. As shown in block 618, the apparatus 200 embodied by the UE 102 is then configured to select a VPLMN in the Preferred PLMN List 503 configured by the HPLMN 502 and to switch communications from the VPLMN in the Network Slice Aware PLMN Exception List to the selected VPLMN from the Preferred PLMN List 503.

FIG. 7b illustrates a flowchart of the operations of an example method 710 performed by an example apparatus 200, wherein the apparatus 200 of an example embodiment is configured to perform the process of method 710 by execution of a related computer program product comprising computer program code. As shown in block 711, apparatus 200 includes means, such as the processor 202, the memory 204 or the like, for storing a Preferred PLMN List 503, such as may be configured and provided by a HPLMN 502. As shown in block 712, apparatus 200 also includes means, such as the processor 202, the memory 204 or the like, for storing a Network Slice Aware PLMN Exception List 501, such as may also be configured and provided by a HPLMN 502.

As shown in block 713, apparatus 200 includes means, such as the processor 202, the communication interface 206 or the like, for determining a present location and/or Mobile Country Code (MCC), such as based on available network data and/or Global Position Satellite (GPS) data. As shown in block 714, apparatus 200 includes means, such as the processor 202 or the like, for selecting to use only VPLMNs in the Preferred PLMN List 503. In this regard, the apparatus 200, such as the processor 202, may be configured to select to use VPLMNs in the Preferred PLMN List 503 and not VPLMNs in the Network Slice Aware PLMN Exception List 501. As shown in block 715, apparatus 200 also includes means, such as the processor 202, the communication interface 206 or the like, for determining availability of at least one VPLMN listed in the Preferred PLMN List 503. From among the available VPLMN(s) that are listed in the Preferred PLMN List 503 and as shown in block 716, apparatus 200 includes means, such as the processor 202, for selecting a VPLMN that is in the Preferred PLMN List 503 and that is accessible at the present location and to then begin communications with the selected VPLMN. In an instance in which a plurality of VPLMNs of the Preferred PLMN List 503 are available, the apparatus 200, such as the processor 202, may be configured to select a particular VPLMN in any of various different manners. For example, an order of precedence may have been established for the VPLMNs of the Preferred PLMN List 503 such that the apparatus 200, such as the processor 202, selects the particular PLMN based upon the order of precedence. In this regard, the VPLMNs may also have been weighted according to a predefined criteria with the order of precedence taking into account the weighting of the VPLMNs. Alternatively, the apparatus 200, such as the processor 202, may be configured to select the VPLMN of the Preferred PLMN List 503 that includes the largest number of NFs in the present location. Regardless of the manner in which the particular PLMN of the Preferred PLMN List 503 is selected, the apparatus 200, such as the processor 202, is configured to then establish communications and interact with the particular PLMN. In still other embodiments, such as in an instance in which the other methods fail to identify a single VPLMN for selection, a user of the UE 102 may be informed, such as via a user interface, as of the options with respect to the VPLMNs and may be requested to select the VPLMN to be utilized. As used herein, a user of the UE 102 may be a person or may be automated, such as via an application programming interface (API).

As shown in block 717, apparatus 200 includes means, such as the processor 202 or the like, for subsequently determining that at least one VPLMN that is in the Network Slice Aware PLMN Exception List 501 is required for use of a particular network function or UE feature which requires a certain network slice to be used. In this regard, the apparatus 200 such as the processor 202, is configured to determine that the particular network function or feature is not provided or supported by the particular VPLMN of the Preferred PLMN List 503 with which the UE is currently in communication and, in some embodiments, that the particular network function or feature is also not provided or supported by any other VPLMN of the Preferred PLMN List. In this instance, the apparatus 200, such as the processor 202, is configured to consider the functions or features supported by the VPLMNs of the Network Slice Aware PLMN Exception List 501 and to identify one or more VPLMNs of the Network Slice Aware PLMN Exception List 501 that do support the function or feature that is needed or desired by the UE 102.

As shown in block 718, apparatus 200 includes means, such as the processor 202, the communications interface 206 or the like, for selecting a VPLMN in the Network Slice Aware PLMN Exception List 501 that is compatible with, that is that supports or provides, the particular network function or UE feature which requires a certain network slice to be used. In an instance in which a plurality of VPLMNs of the Network Slice Aware PLMN Exception List 501 are available, the apparatus 200, such as the processor 202, may be configured to select a particular VPLMN in any of various different manners. For example, an order of precedence may have been established for the VPLMNs of the Network Slice Aware PLMN Exception List 501 such that the apparatus 200, such as the processor 202, selects the particular PLMN based upon the order of precedence. Alternatively, the apparatus 200, such as the processor 202, may be configured to select the VPLMN of the Network Slice Aware PLMN Exception List 501 that includes the largest number of NFs in the present location. Regardless of the manner in which the particular PLMN of the Network Slice Aware PLMN Exception List 501 is selected, the apparatus 200, such as the processor 202, is configured to then establish communications and interact with the particular PLMN.

As shown in block 719, apparatus 200 includes means, such as the processor 202 or the like, for determining that the particular network function or feature that is not supported by the VPLMNs of the Preferred PLMN List 503 and that triggered the switch to a VPLMN from the Network Slice Aware PLMN Exception List 501 is no longer required or desired by the UE 102. Since the particular network function or feature is no longer required or desired and as shown in block 720, apparatus 200 also includes means, such as the processor 202 or the like, for correspondingly determining that none of the at least one VPLMN that is in the Network Slice Aware PLMN Exception List 501 and that was previously selected to provide the particular network function or feature is also no longer required. As shown in block 721, apparatus 200 includes means, such as the processor 202, the communication interface 206 or the like, for selecting a VPLMN that is in the Preferred PLMN List 503 and that is available at the present location. The VPLMN that is selected from the Preferred PLMN List 503 may be the same VPLMN that was previously selected and utilized prior to the switch to a VPLMN from the Network Slice Aware PLMN Exception List 501. Alternatively, the VPLMN that is selected from the Preferred PLMN List 503 may be a different VPLMN from that which was previously selected. In this instance, the VPLMN that is selected from the Preferred PLMN List 503 may be selected based on an order of precedence, based on a number of NFs supported or otherwise as described above.

By way of a further example, FIG. 8 illustrates a flowchart of the operations of an example method 810 performed by an example apparatus 200 which, in one embodiment, may be embodied by a computer program product comprising computer program code executed by processor 202. As shown in block 811, apparatus 200 of this example embodiment includes means, such as the processor 202, the memory 204, the communication interface 206 or the like, for receiving the Network Slice Aware PLMN Exceptions List 501 and the Preferred PLMN List 503, such as from a HPLMN 502. As shown in block 812, apparatus 200 includes means, such as the processor 202, the communication interface 206 or the like, for determining that the UE 102 is in a location with one or more VPLMNs that are included in the Network Slice Aware PLMN Exceptions List 501. As shown in block 813, apparatus 200 includes means, such as the processor 202 or the like, for determining to utilize, at least initially, only VPLMNs that are not associated with the Network Slice Aware PLMN Exceptions List 501 but that are, instead, associated with the Preferred PLMN List 503. As shown in block 814, apparatus 200 also incudes means, such as processor 202 or the like, for selecting a VPLMN associated with a Preferred PLMN List 503, such as described above. The UE 102 that embodies the apparatus 200 then communicates via and interacts with the selected VPLMN.

As shown in block 815, apparatus 200 incudes means, such as the processor 202, for identifying a network slice not supported by the selected VPLMN, in order to provide network support for at least one feature that the UE 102 or a user of the UE is attempting to utilize which is not supported by the currently selected network slice. As shown in block 816, apparatus 200 including means, such as the processor 202 or the like, for selecting another VPLMN that supports the network slice. If the UE feature were supported by another VPLMN of the Preferred PLMN list 503, the other VPLMN could be selected from the Preferred PLMN List. In this example embodiment, however, no VPLMN of the Preferred PLMN List 503 supports the UE feature such that the other VPLMN that supports the UE feature is not associated with the Preferred PLMN List 503, but is, instead, associated with a Network Slice Aware PLMN Exceptions List 501, or another VPLMN associated with the preferred PLMN list which supports the network slice. The UE 102 that embodies the apparatus 200 then ceases its connection to the VPLMN that was previously selected from the Preferred PLMN List 503 and, instead, communicates via and interacts with the selected VPLMN from the Network Slice Aware PLMN Exceptions List 501.

As shown in block 817, apparatus 200 also includes means, such as the processor 202 or the like, for determining that the identified network slice supported by a selected VPLMN that is associated with a network slice aware PLMN exceptions list is no longer required or desired. In this instance and as shown in block 818, apparatus 200 includes means for transferring a connection from the selected VPLMN from the Network Slice Aware PLMN Exceptions List 501 to a VPLMN from the Preferred PLMN List 503.

As described above, the VPLMN from the Preferred PLMN List 503 to which the connected is transferred may be the same VPLMN that was previously selected from the Preferred PLMN List or a different VPLMN. In an example embodiment, the apparatus 200, such as the processor 202, is configured to transfer the connection during an idle time of the user equipment. In an example embodiment, the idle time of the user equipment is a predefined length of time in which the user equipment is not sending or receiving any communication signals utilizing the selected VPLMN from the Network Slice Aware PLMN Exceptions List 501 or the Preferred PLMN List 503.

Upon request by the UE 102 for a network function not supported by the current network slice of the current VPLMN, the UE 102 determines that the network slice is incompatible with the requested network function. The UE 102 further determines that the current VPLMN is also incompatible with the requested network function on any other network slices associated with the current VPLMN.

In an example embodiment in which the VPLMN that is supporting the UE 102 is or becomes incompatible with a required or desired network function and in an instance in which the apparatus 200, such as the processor 202, is not configured to immediately select a different VPLMN from the Network Slice Aware PLMN Exceptions List 501, the apparatus 200, such as the processor 202, as embodied as the UE 102 may be configured to first select and test the other respective preferred PLMNs of the Preferred PLMNs List 501 to determine if they are compatible with the required or desired network slice. If a preferred PLMN is compatible, support for the UE 102 may be transferred to the other preferred PLMN. In an instance in which none of the respective preferred PLMNs of the Preferred PLMNs List 501 are compatible with the required or desired network slice, then the apparatus 200, such as the processor 202, of this example embodiment may be configured to select and test the respective PLMNs from the Network Slice Aware PLMN Exceptions List 501 for compatibility with the required or desired network slice and, if a respective PLMN is compatible, will then select the respective PLMN from the Network Slice Aware PLMN Exceptions List 501 to support the UE 102.

In an example embodiment, the UE 102 can collect PLMN identities, access technologies, and/or S-NSSAIs broadcasts by way of a plurality of access networks. In order to make this available, access networks are enhanced to broadcast one or more S-NSSAIs supported by the access network. If there exist one or more network slices that the UE 102 needs to make use of, the UE 102 excludes these network slices from the network selection candidates, for example, any PLMN identity, access technology, the like, or combination thereof which does not support the S-NSSAI(s).

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory device, e.g., 204, of an apparatus, e.g., 200, employing an embodiment of the present invention and executed by processor, e.g., 202, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations, methods, steps, processes, or the like, above can be modified or further amplified. Furthermore, in some embodiments, additional optional operations, methods, steps, processes, or the like, can be included. Modifications, additions, subtractions, inversions, correlations, proportional relationships, disproportional relationships, attenuation and/or amplifications to the operations above can be performed in any order and in any combination. It will also be appreciated that in instances where particular operations, methods, steps, processes, or the like, required particular hardware such hardware should be considered as part of apparatus 200 for any such embodiment. For example, as described above where a GPS is used to determine the location of apparatus 200 such appropriate GPS modules and hardware should be considered integral to apparatus 200.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed is:
1. An apparatus comprising:
at least one processor; and at least one memory including computer program code, the at least one memory and the computer program code configured to, with the at least one processor, cause the apparatus at least to:

select a Visited Public Land Mobile Network (VPLMN) among VPLMNs associated with a preferred Public Land Mobile Network (PLMN) list from a Home Public Land Mobile Network (HPLMN);

identify a network slice for a particular network function or user equipment feature not supported by the selected VPLMN;

receive a network slice aware PLMN exceptions list from the HPLMN for supporting the particular network function or user equipment feature, wherein the network slice aware PLMN exceptions list defines a precedence order associated with the VPLMNs associated with the network slice aware PLMN exceptions list;

select another VPLMN that supports the network slice, wherein the another VPLMN is not associated with the preferred PLMN list but is associated with the network slice aware PLMN exceptions list, only when no VPLMN in the preferred PLMN list supports the network slice;

wherein the at least one memory and the computer program code are further configured to, with the at least one processor, cause the apparatus at least to:

determine the identified network slice supported by the another VPLMN that is associated with the network slice aware PLMN exceptions list is no longer required by the apparatus because the particular network function or user equipment feature is no longer required or desired by a user equipment; and select a VPLMN associated with the preferred PLMN list during a next idle time of the user equipment if the user equipment is currently connected and transferring data on the another VPLMN.

2. An apparatus according to claim 1, wherein the at least one memory and the computer program code are further configured to, with the at least one processor, cause the apparatus to:

upon request for a network function not supported by the current network slice of the current VPLMN, determine that the network slice is incompatible with the requested network function;

determine that the current VPLMN is also incompatible with the requested network function on any other network slices associated with the current VPLMN.

3. An apparatus according to claim 2, wherein the at least one memory and the computer program code are configured to, with the at least one processor, cause the apparatus to:

in the case that the VPLMN that is supporting the user equipment is or becomes incompatible with a required or desired network function and in an instance in which the apparatus is not configured to immediately select a different VPLMN from the Network Slice Aware PLMN Exceptions List, first select and test the other respective preferred PLMNs of the Preferred PLMNs List to determine if they are compatible with the required or desired network slice, wherein if a preferred PLMN is compatible, support for the user equipment is transferred to the other preferred PLMN; and in an instance in which none of the respective preferred PLMNs of the Preferred PLMNs List are compatible with the required or desired network slice, select and test the respective PLMNs from the Network Slice Aware PLMN.

4. An apparatus according to claim 1, wherein the at least one memory and the computer program code are further configured to, with the at least one processor, cause the apparatus to:

determine that user equipment is in a location with one or more VPLMNs that are included in the network slice aware PLMN exceptions list; and determine to utilize, at least initially, only VPLMNs not associated with the network slice aware PLMN exceptions list prior to selecting the VPLMN associated with the preferred PLMN list.

5. An apparatus according to claim 1, wherein the at least one memory and the computer program code are configured to, with the at least one processor, cause the apparatus to select another VPLMN by selecting single network slice selection assistance information (S-NSSAI) associated with the network slice aware PLMN exceptions list and identifying the another VPLMN, wherein the apparatus collects PLMN identities, access technologies, and S-NSSAIs broadcasts by way of a plurality of access networks that are enhanced to broadcast one or more S-NSSAIs supported by the access network.

6. An apparatus according to claim 1, wherein the at least one memory and the computer program code are further configured to, with the at least one processor, cause the apparatus to:

receive the network slice aware PLMN exceptions list from a Home Public Land Mobile Network (HPLMN).

7. An apparatus according to claim 1, wherein the idle time of the user equipment is a predefined length of time in which the user equipment is not sending or receiving any communication signals utilizing the selected VPLMN from the Network Slice Aware PLMN Exceptions List or the Preferred PLMN List.

8. An apparatus according to claim 1, wherein the at least one memory and the computer program code are further configured to, with the at least one processor, cause the apparatus to learn which network slices a particular VPLMN supports by attempting to register with the particular VPLMN and detecting which network slice in a registration request is rejected by the particular VPLMN with a cause code indicating that the network slice is not supported in the PLMN.

9. An apparatus according to claim 1, wherein the at least one memory and the computer program code are further configured to, with the at least one processor, cause the apparatus, upon receiving an indication a network slice is not supported in a VPLMN, to select another VPLMN known to support that network slice.

10. An apparatus according to claim 1, wherein the at least one memory and the computer program code are further configured to, with the at least one processor, cause the apparatus, upon receiving an indication the network slice is not supported by the VPLMN, to select another VPLMN in order to attempt requesting the use of said network slice.

11. A method comprising:

selecting a Visited Public Land Mobile Network (VPLMN) among VPLMNs associated with a preferred Public Land Mobile Network (PLMN) list from a Home Public Land Mobile Network (HPLMN);

identifying a network slice for a particular network function or user equipment feature not supported by the selected VPLMN;

receiving a network slice aware PLMN exceptions list from the HPLMN for supporting the particular network function or user equipment feature, wherein the network slice aware PLMN exceptions list defines a precedence order associated with the VPLMNs associated with the network slice aware PLMN exceptions list; and selecting another VPLMN that supports the network slice, wherein the another VPLMN is not associated with the preferred PLMN list but is associated with a network slice aware PLMN exceptions list, only when no VPLMN in the preferred PLMN list supports the network slice or the another VPLMN is associated with the preferred PLMN list which supports the network slice; wherein the method further comprises:

determining the identified network slice supported by the another VPLMN that is associated with the network slice aware PLMN exceptions list is no longer required because the particular network function or user equipment feature is no longer required or desired by a user equipment; and selecting a VPLMN associated with the preferred PLMN list during a next idle time of the user equipment if the user equipment is currently connected and transferring data on the another VPLMN.

12. A method according to claim 11, further comprising:
upon request for a network function not supported by the current network slice of the current VPLMN, determining that the network slice is incompatible with the requested network function;
determining that the current VPLMN is also incompatible with the requested network function on any other network slices associated with the current VPLMN.

13. A method according to claim 11, further comprising:
determining that user equipment is in a location with one or more VPLMNs that are included in the network slice aware PLMN exceptions list; and
determining to utilize, at least initially, only VPLMNs not associated with the network slice aware PLMN exceptions list prior to selecting the VPLMN associated with the preferred PLMN list.

14. A method according to claim 11, wherein selecting another VPLMN comprises selecting single network slice selection assistance information (S-NSSAI) associated with the network slice aware PLMN exceptions list and identifying the another VPLMN, and the method further comprises collecting PLMN identities, access technologies, and S-NSSAIs broadcasts by way of a plurality of access networks that are enhanced to broadcast one or more S-NSSAIs supported by the access network.

15. A method according to claim 11, wherein idle time of the user equipment is a predefined length of time in which the user equipment is not sending or receiving any communication signals utilizing the selected VPLMN from the Network Slice Aware PLMN Exceptions List or the Preferred PLMN List.

16. A method according to claim 11, wherein the network slice aware PLMN exceptions list defines a precedence order associated with the VPLMNs associated with the network slice aware PLMN exceptions list.

17. A method according to claim 11, further comprising learning which network slices a particular VPLMN supports by attempting to register with the particular VPLMN and detecting which network slice in a registration request is rejected by the particular VPLMN with a cause code indicating that the network slice is not supported in the PLMN.

18. A method according to claim 11, wherein, upon receiving an indication a network slice is not supported in a VPLMN, the method further comprises selecting another VPLMN known to support that network slice.

19. A method according to claim 11, wherein, upon receiving an indication the network slice is not supported by the VPLMN, the method further comprises selecting another VPLMN in order to attempt requesting the use of the network slice.

20. A computer program product comprising a non-transitory computer readable storage medium having program code portions stored thereon, the program code portions configured, upon execution, to perform:
select a Visited Public Land Mobile Network (VPLMN) among VPLMNs associated with a preferred Public Land Mobile Network (PLMN) list from a Home Public Land Mobile Network (HPLMN);
identify a network slice for a particular network function or user equipment feature not supported by the selected VPLMN;
receive a network slice aware PLMN exceptions list from the HPLMN for supporting the particular network function or user equipment feature, wherein the network slice aware PLMN exceptions list defines a precedence order associated with the VPLMNs associated with the network slice aware PLMN exceptions list;
select another VPLMN that supports the network slice, wherein the another VPLMN is not associated with the preferred PLMN list but is associated with a network slice aware PLMN exceptions list, only when no VPLMN in the preferred PLMN list supports the network slice, or the another VPLMN is associated with the preferred PLMN list which supports the network slice;
determine the identified network slice supported by the another VPLMN that is associated with the network slice aware PLMN exceptions list is no longer required because the particular network function or user equipment feature is no longer required or desired by a user equipment; and
select a VPLMN associated with the preferred PLMN list during a next idle time of the user equipment if the user equipment is currently connected and transferring data on the another VPLMN.

* * * * *